United States Patent
Cook et al.

(10) Patent No.: US 6,580,847 B2
(45) Date of Patent: Jun. 17, 2003

(54) MULTISTAGE PHOTONIC SWITCH FAULT ISOLATION

(75) Inventors: Ken N. Cook, San Jose, CA (US); Dale W Schroeder, Scotts Valley, CA (US)

(73) Assignee: Agilent Technologies, Inc., Palo Alto, CA (US)

(*) Notice: Subject to any disclaimer, the term of this patent is extended or adjusted under 35 U.S.C. 154(b) by 0 days.

(21) Appl. No.: 09/881,330

(22) Filed: Jun. 13, 2001

(65) Prior Publication Data

US 2003/0002775 A1 Jan. 2, 2003

(51) Int. Cl.[7] ............................. G02B 6/26; G02B 6/42
(52) U.S. Cl. ........................... 385/16; 385/17; 359/117
(58) Field of Search ...................... 385/16–23; 359/117

(56) References Cited

U.S. PATENT DOCUMENTS

| | | | | |
|---|---|---|---|---|
| 5,664,034 A | * | 9/1997 | Mock | 385/15 |
| 5,790,285 A | * | 8/1998 | Mock | 356/73.1 |
| 6,044,185 A | * | 3/2000 | MacDonald | 385/16 |
| 6,198,856 B1 | | 3/2001 | Schroeder et al. | 385/17 |
| 6,160,928 A1 | | 12/2001 | Schroeder | 385/18 |
| 2001/0024540 A1 | * | 9/2001 | Ibukuro et al. | 385/17 |

* cited by examiner

Primary Examiner—Robert H. Kim
Assistant Examiner—Krystyna Suchecki
(74) Attorney, Agent, or Firm—Judy Liao Shie

(57) ABSTRACT

The present invention is a method for isolating faults in multi-stage photonic switch networks. Photonic switches in a photonic switch network are first verified individually, using self-test paths built into the photonic switch. Then, interconnecting optical fibers of the photonic switch network are checked. Each photonic switch is equipped with a transmitter and detector. During test, a photonic switch uses its transmitter to transmit light through an optical fiber interconnection to a second photonic switch. Pre-existing pathways within the photonic switches are used to access and route the light. When the second photonic switch detects the transmitted light, the optical fiber interconnection passes the continuity test. When the light cannot be detected, the optical fiber interconnection has a fault that must be repaired. By repeating this process for all optical fiber interconnections between all photonic switches, the photonic switch network can be checked for faults.

19 Claims, 6 Drawing Sheets

MULTISTAGE PHOTONIC SWITCH FAULT ISOLATION

BACKGROUND

The present invention relates generally to photonic switches, and more particularly to a method for isolating faults in interconnections between photonic switches.

Optical fibers are increasingly prevalent in the transmission lines of data networks, due to their higher bandwidth capabilities compared to wire transmission lines. Before the photonic switch was invented, light signals switching from one optical fiber to another first were converted to and from electrical impulses using optical-to-electrical-to-optical equipment. The conversion process was time-consuming and slowed the speed of data traveling in the network. The photonic switch provided a way to keep the data network completely optical and thus speed up data transfer rates.

Many photonic switches are designed to be modular, so that several photonic switches can be connected together using optical fibers to create one larger photonic switch, hereinafter called a photonic switch network. The modularity of the photonic switches gives the customer the flexibility to make a photonic switch network as large or small as desired. The optical fibers in a photonic switch network have to be tested for continuity and proper operation. Typically, an optical fiber is tested by transmitting light through one end of the optical fiber, and checking for the light at the other end with a detector. When the light is detected, the optical fiber is working correctly. When no light is detected, a break in continuity—also known as a fault—exists within the optical fiber, and the optical fiber must either be fixed or replaced.

In the past, testing the continuity of the interconnecting optical fibers in a photonic switch network was not a simple matter. The optical fibers are connected directly from the data output of one switch to the data input of another, making it difficult to access any of the test light signals. One prior art solution was to use an optical fiber with a light-dividing device, such as a tap or splinter, for each interconnection between photonic switches. A tap or spliter is an optical d device that splits the original signal into two or more signals. These split-off signals may or may not differ from each other in signal strength, but are identical in data content. One of the split signals would lead to the normal data path, maintaining the data connection; another signal can be drawn off into a test system. There are drawbacks to this method. First, an optical fiber with a light-dividing device is more expensive than a plain optical fiber. When there are thousands of interconnections to be tested, the additional cost of the light-dividing devices can be quite high. Secondly, the light-dividing device itself can introduce faults into the photonic switch network. This makes it difficult to determine whether a fault lies in an optical fiber, or the associated light-dividing device. Finally, the power of each split-off signal is less than the original, which can cause problems during testing. If the split-off test signal from an optical fiber is too weak, the detector will be unable to detect it, and would instead indicate a fault in that particular optical fiber where none exists. This mistake can cause a flawless optical fiber to be needlessly replaced.

Accordingly, there remains a need for an improved method for testing interconnecting optical fibers in a photonic switch network.

SUMMARY

The present invention provides a simple and reliable method for isolating faults in interconnections between photonic switches. The photonic switches are first verified individually, using self-test paths built into every photonic switch. Once each individual photonic switch has been verified, the interconnecting optical fibers of the photonic switch network are checked. Each photonic switch is equipped with a transceiver consisting of a transmitter and a receiver. During test, a photonic switch uses its transmitter to transmit light through an optical fiber interconnection to a second photonic switch. Pre-existing pathways within the photonic switches are used to access and route the test light signals, thus eliminating the need for light-dividing devices altogether. When the second photonic switch detects the transmitted light with its receiver, the optical fiber interconnection passes the continuity test. When the second photonic switch cannot detect the light, the optical fiber interconnection has a fault that must be repaired. By repeating this process for all optical fiber interconnections between all photonic switches, the photonic switch network can be tested for proper operation.

Further features of the present invention, as well as the structure and operation of preferred embodiments of the present invention, are described in detail below with reference to the accompanying exemplary drawings. In the drawings, like reference numbers indicate identical or functionally similar elements.

DETAILED DESCRIPTION

Figure 1:
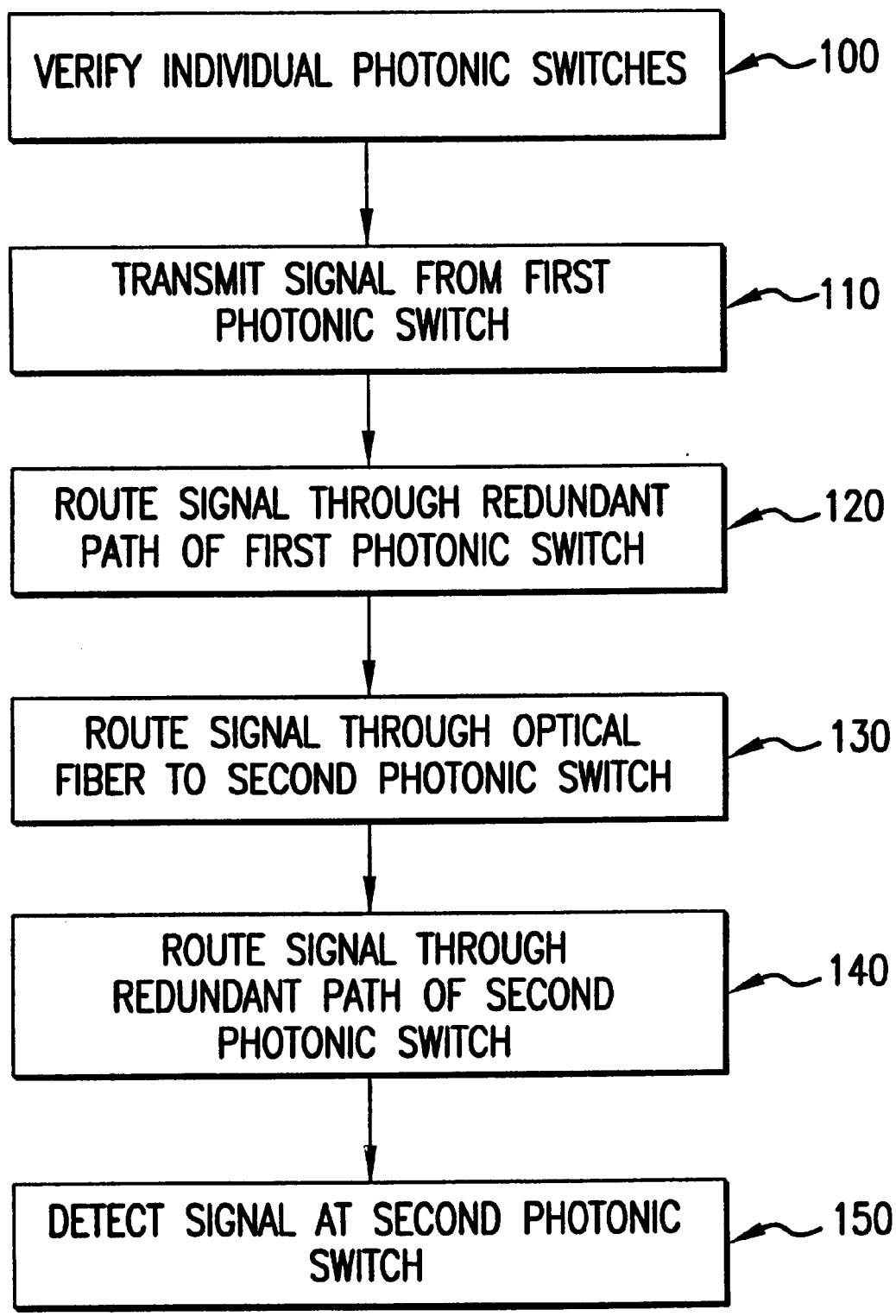
FIG. 1 illustrates a flowchart of the method used to isolate faults in a photonic switch network.

FIG. 1 illustrates a flowchart of the method used to isolate faults in a photonic switch network, made in accordance with the teachings of the present invention. A fault is defined as any problem that would prevent a signal from being routed correctly through the photonic switch network, such as a discontinuity within the waveguide, or an improperly functioning switch point. In step 100, the individual photonic switches in the photonic switch network are verified to ensure there are no faults within. This verification is performed using self-test mechanisms built into every photonic switch. In step 110, a test signal is transmitted from the first switch. The test signal may be, but is not limited to being, infrared light Infrared light is defined as the region of the electromagnetic spectrum having wavelengths between 0.7 micrometer and 1 millimeter, inclusive. In step 120, the test signal is routed through a redundant path of the first switch. The redundant path is a bypass path through the photonic switch in case one of the other paths should fail. In step 130, the test signal is routed through an optical fiber connecting the first photonic switch to a second photonic switch. In step 140, the test signal is routed through a redundant path of the second photonic switch. Finally, in step 150, a detector at the second photonic switch checks for the test signal. If the test signal is detected, then there are no faults in the optical fiber. Otherwise, a fault exists and the optical fiber must be fixed or replaced.

Figure 2:
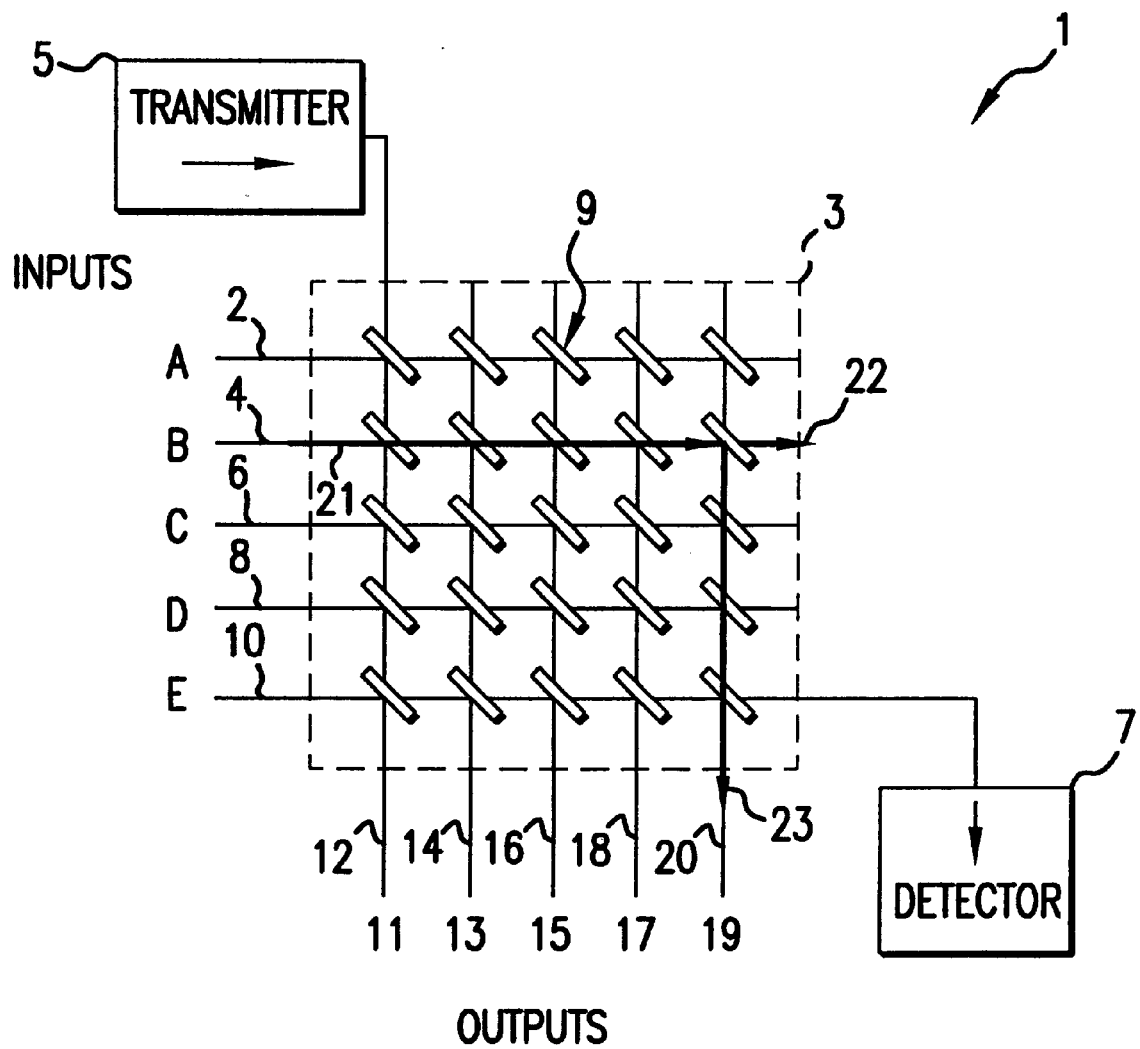
FIG. 2 is an example of a prior art photonic switch.

FIG. 2 is an example of a prior art photonic switch 1, as described by U.S. Pat. 6,160,928 to Schroeder and U.S. Pat. No. 6,198,856 to Schroeder et al., both assigned to Agilent Technologies. The photonic switch 1 has a waveguide array 3, a built-in transmitter 5, and a built-in detector 7. The waveguide array 3 has horizontal waveguides A, B, C, D, E, (also designated as inputs 2, 4, 6, 8, and 10) and vertical waveguides 11, 13, 15, 17, 19 (also designated as outputs 12, 14, 16, 18, 20). At the intersection of each waveguide is a switch point, as exemplified by reference number 9. Each switch point 9 is uniquely identified in FIG. 2 by the combined reference numbers of its intersecting waveguides. For example, the switch point 9 at the intersection of horizontal waveguide A and vertical waveguide 15 is uniquely identified by the coordinate A15. The switch point 9 can either be inactive or active, at any given point in time. When the switch point 9 is inactive, a signal in a waveguide that intersects the switch point 9 passes straight through, unchanged. When the switch point 9 is active, the signal in the waveguide passing through the switch point 9 is deflected to an intersecting waveguide. For example, if switch point B19 is inactive, an incoming signal 21 passing through switch point B19 will continue straight through as signal 22. If switch point B19 is active, an incoming signal 21 will be deflected as signal 23.

Figure 3:
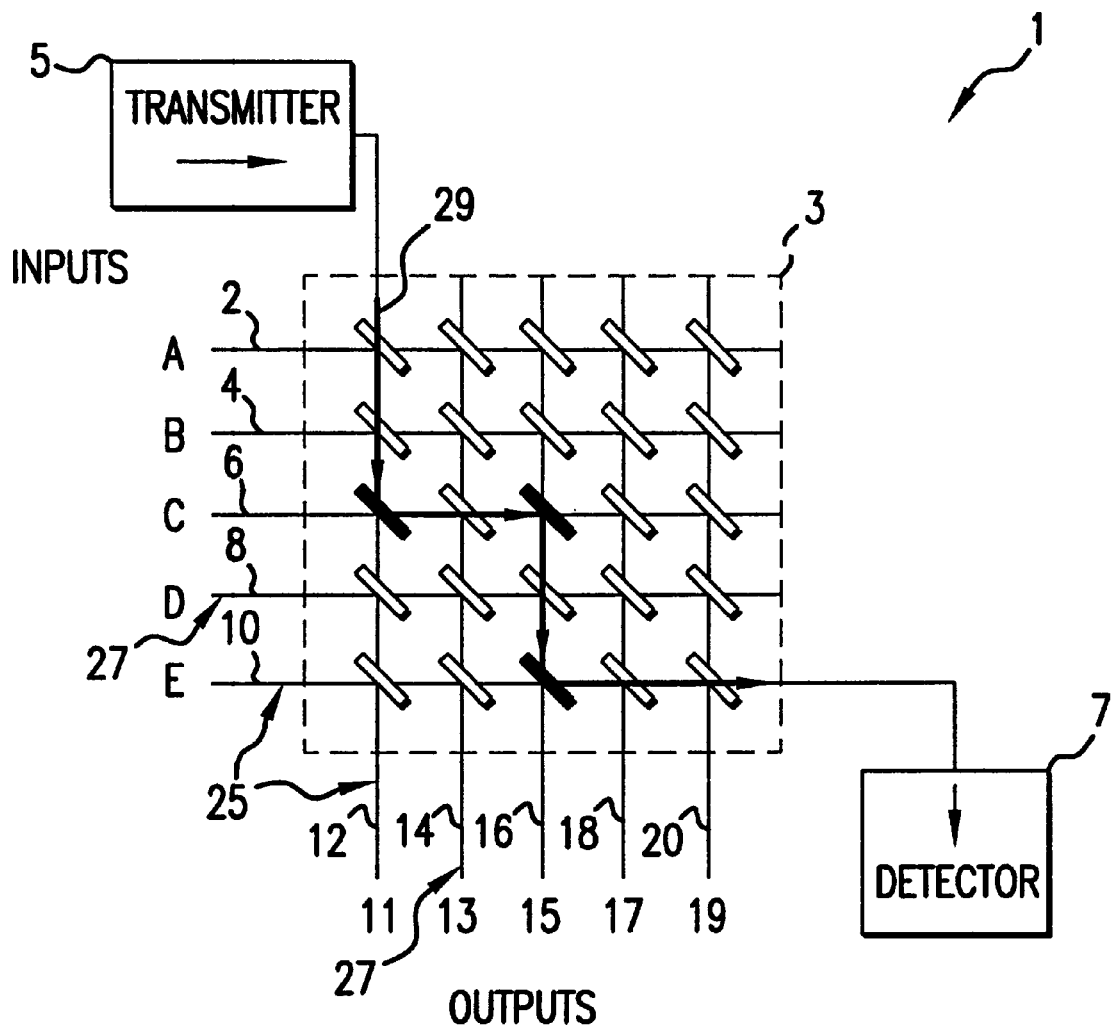
FIG. 3 illustrates how to test for faults in the same photonic switch as shown in FIG. 2.

FIG. 3 illustrates the same photonic switch 1 as shown in FIG. 2. Within the waveguide array 3, a few waveguides are reserved for performing special functions. A test path 25, comprising a vertical and horizontal waveguide, is designated for performing self-tests on the photonic switch 1. In this example, the test path 25 consists of waveguide 11 and waveguide E. It is optically connected to the built-in transmitter 5 and to the built-in detector 7. The signal emitted by the built-in transmitter 5 is intended for transmission of optical data, such as infrared light. Another set of waveguides—waveguide D and waveguide 13 in this example—form a redundant path 27. The redundant path 27 is unused under normal circumstances. It is used as a backup path in case one of the other waveguides or switch points malfunction.

The test path 25 is used to find faults within the waveguide array 3. By selectively activating switch points along test path 25, the waveguide array 3 can be tested for faults.

For example, to verify the functionality of switch point C15, the switch points C11 and E15 on test path 25, along with switch point C15 itself, should be activated. As shown in FIG. 3, a signal 29 transmitted from the built-in transmitter 5 travels along test path 25, reflects off the activated switch points back to the test path 25, and finally ends at built-in detector 7. When the built-in detector 7 detects the signal 29, all the activated switch points are operating correctly, and switch point C15 in particular has been verified. When the built-in detector 7 cannot detect the signal 29, a fault must exist somewhere along the path. After methodically testing each waveguide and switch point 9 in this manner, the entire waveguide array 3 can be verified.

Figure 4:
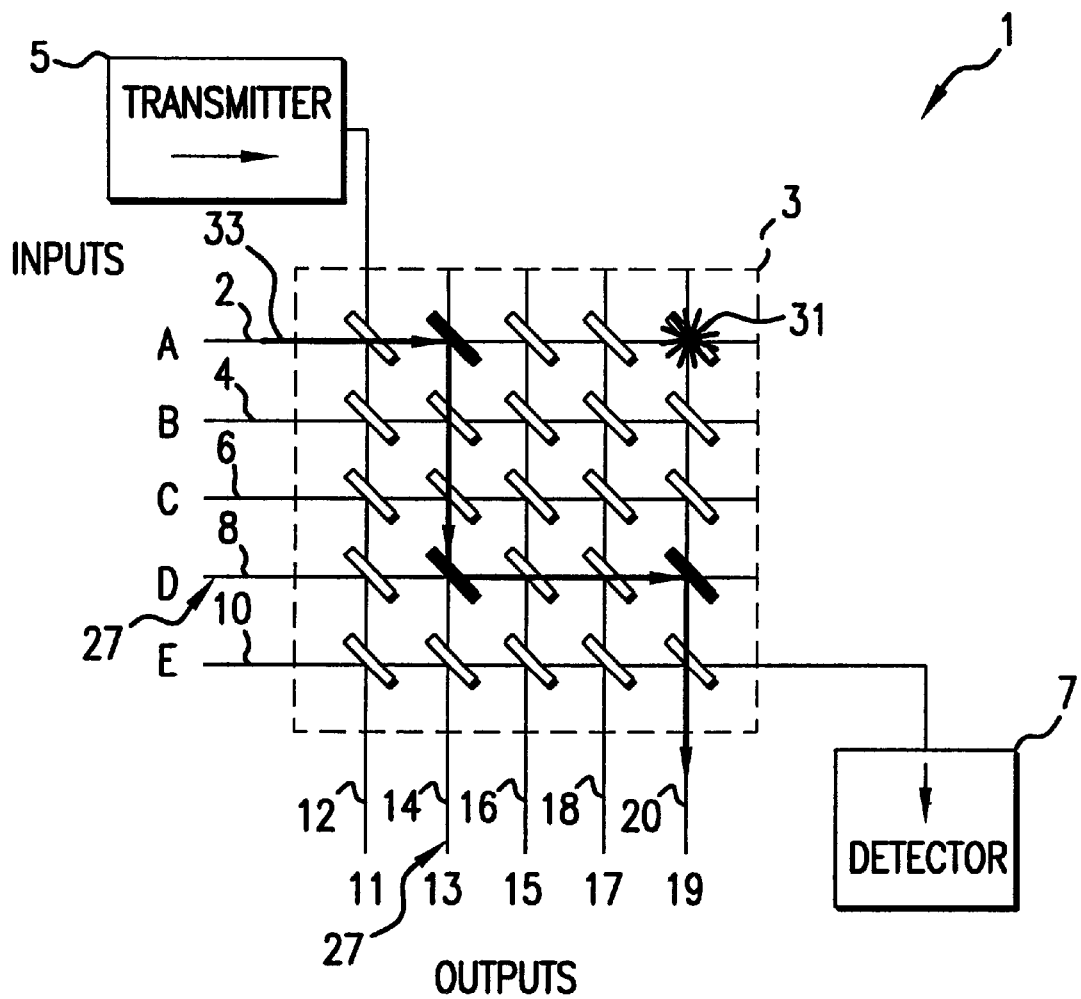
FIG. 4 illustrates the same photonic switch as shown in FIGS. 2 and 3, having a fault located at a switch point A19.

FIG. 4 illustrates the same photonic switch 1 as shown in FIGS. 2 and 3, with a fault 31 located at switch point A19. The redundant path 27 is used as a detour when a problem exists somewhere in the waveguide array 3. For instance, due to the location of fault 31, switch point A19 cannot be activated, and a signal cannot be directly deflected from horizontal waveguide A to vertical waveguide 19. However, by using switch points along redundant path 27, the fault 31 can be bypassed. When switch points A13, D13, and D19 are activated, a signal 33 can still be routed from waveguide A to waveguide 19, as illustrated in FIG. 4. The redundant path 27 is a useful feature that provides robustness to the waveguide array 3.

Figure 5:
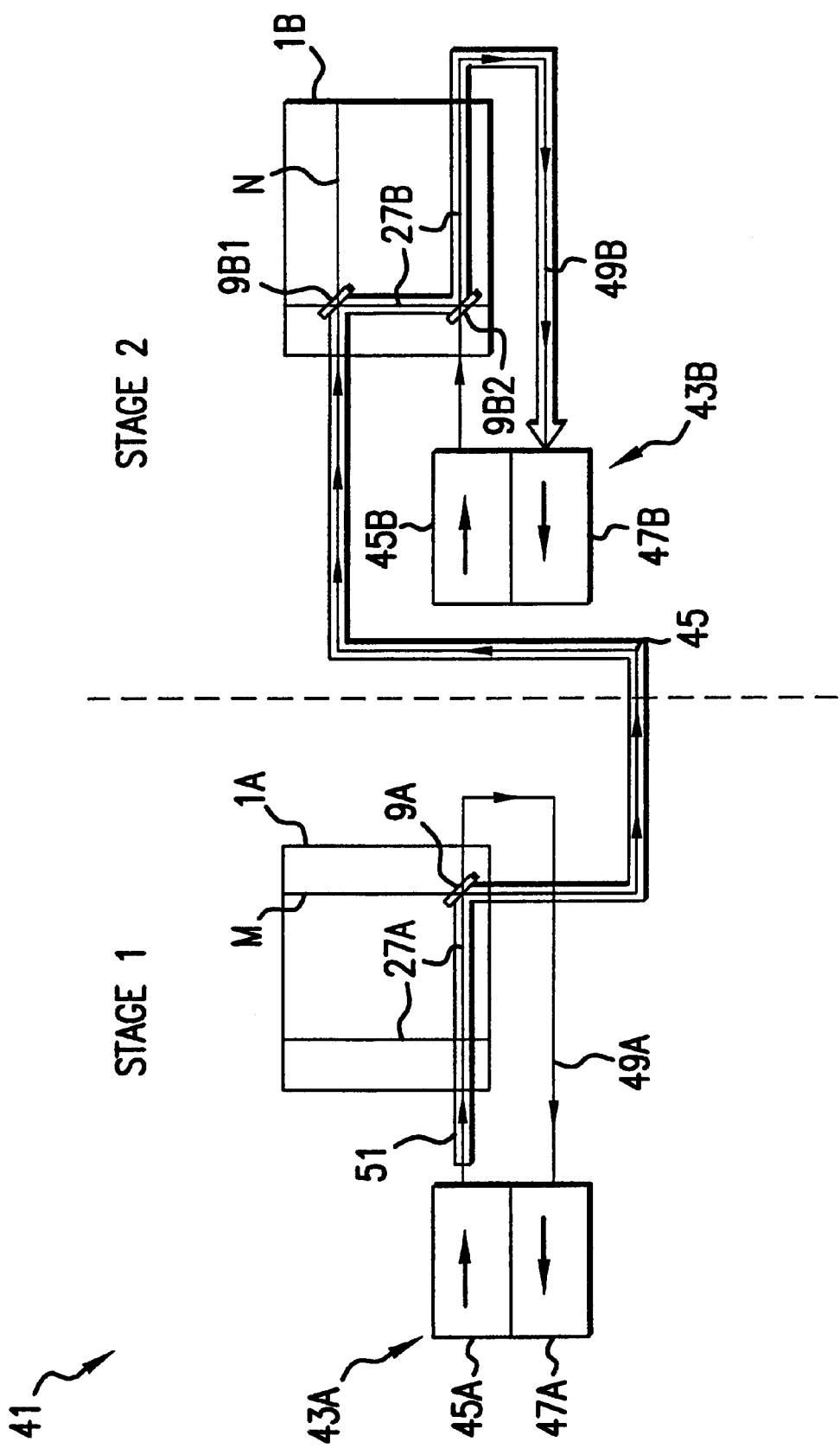
FIG. 5 depicts a preferred embodiment for testing a photonic switch network.

FIG. 5 depicts a preferred embodiment for testing a photonic switch network 41, made in accordance with the teachings of the present invention. Stage 1 has a single photonic switch 1A, stage 2 has a single photonic switch 1B, and each photonic switch is illustrated with only the relevant waveguides visible. Photonic switch 1A has a redundant path 27A intersected by a waveguide M, and a switch point 9A located at their intersection. A transmitter 45A and a detector 47A are optically connected to the redundant path 27A through a self-test loop 49A. The transmitter 45A and detector 47A may be separate components, or combined into a single transceiver 43A. Photonic switch 1B has a redundant path 27B intersected by a waveguide N, and a switch point 9B1 located at their intersection. The redundant path 27B intersects itself at switch point 9B2. A transmitter 45B and a detector 47B are optically connected to the redundant path 27B through a self-test loop 49B. The transmitter 45B and detector 47B may be separate components, or combined into a single transceiver 43B. An optical connection 45 connects the output of waveguide M to the input of waveguide N, and must be verified to ensure proper operation of the photonic switch network 41.

Before verifying optical connection 45, each photonic switch must first check for faults within itself. Each photonic switch runs an internal self-test using its built-in transmitter 5, built-in detector 7, and test path 25, as shown in FIG. 3. Each photonic switch also verifies its own self-test loop 49 by transmitting a test signal from its transmitter 45. When the detector 47 detects the test signal, the self-test loop 49 is working correctly. These first two steps constitute step 100 of FIG. 1, eliminating the individual photonic switches as possible sources of faults.

Finally, the interconnecting optical connection 45 can be tested, as described in steps 110 through 150 of FIG. 1. Referring back to FIG. 5, a test signal 51 is transmitted from the transmitter 45A to redundant path 27A. The test signal 51 is routed from the redundant path 27A to waveguide M by activating switch point 9A. The test signal 51 is output from waveguide M to the optical connection 45. When the test signal 51 reaches photonic switch 1B, it continues on to waveguide N. By activating switch points 9B1 and 9B2, the test signal 51 is deflected onto the redundant path 27B of photonic switch 1B. It then travels through self-test loop 49B, where it finally reaches the receiver. When the detector 47B detects the test signal 51, no faults exist in optical connection 45. When the detector 47B cannot detect the test signal 51, a fault must lie in the optical connection 45. By repeating this process for any optical connections that exist between any two photonic switches, the entire photonic switch network 41 can be verified.

Figure 6:
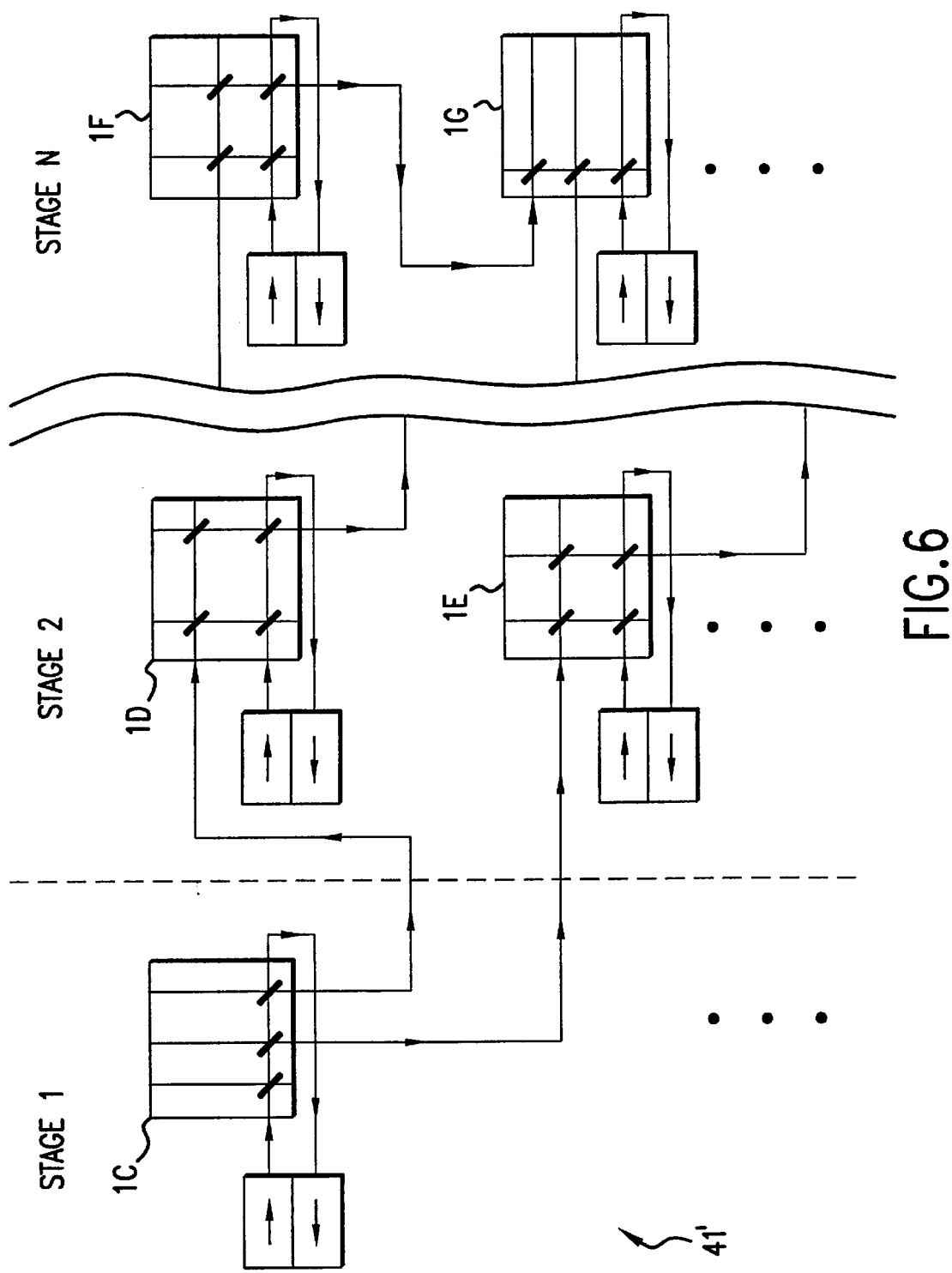
FIG. 6 depicts a few alternative arrangements for photonic switch network.

While FIG. 5 shows a photonic switch network 41 with only two stages, and only one photonic switch per stage, there are many other possible arrangements for interconnecting photonic switches. FIG. 6 depicts a few alternative arrangements for a photonic switch network 41'. A few examples are listed in Table 1.

TABLE 1

| Alternative Arrangement | Example in FIG. 6 |
| --- | --- |
| More than one photonic switch per stage | Stage 2 has photonic switches 1D and 1E Stage N has photonic switches 1F and 1G |

TABLE 1-continued

| Alternative Arrangement | Example in FIG. 6 |
|---|---|
| A single photonic switch connected to more than one photonic switch | Photonic switch 1C is connected to photonic switches 1D and 1E |
| More than two stages in a photonic switch network | Stage N represents the last stage of any number of stages greater than two |
| A photonic switch connected to other photonic switches within the same stage | Photonic switch 1F is connected to photonic switch 1G within Stage N |

There are many other methods, not illustrated due to space considerations, for interconnecting the photonic switches. One arrangement is a multi-stage Clos, a method for networking switches well known in the art. The photonic switches can be connected to other photonic switches that are not in adjacent stages. The photonic switches do not have to be grouped into stages, either.

We claim:

1. A method for detecting faults in interconnecting optical fibers, for selected pairs of interconnected photonic switches in a photonic switch network, comprising the steps of:
   transmitting a first test signal through a redundant path of a first photonic switch;
   routing the first test signal from the first photonic switch, through an interconnecting optical fiber, to a second photonic switch; and
   detecting the first test signal through a redundant path of the second photonic switch.

2. The method as in claim 1, further comprising the step of:
   running a self-test on each photonic switch for internal faults, prior to the step of transmitting, wherein test paths within the photonic switches are conduits for a second test signal to eliminate the photonic switches as fault sources.

3. The method as in claim 2, wherein the transmitting and detecting steps are performed by a transceiver.

4. The method as in claim 2, wherein the first test signal is light, with a wavelength between 0.7 micrometer and 1 millimeter, inclusive.

5. The method as in claim 2, wherein the second test signal is light, with a wavelength between 0.7 micrometer and 1 millimeter, inclusive.

6. An apparatus for fault detection within a photonic switch network, comprising:
   a first stage and a second stage, the first stage having a first stage photonic switch, the second stage having a second stage photonic switch, each photonic switch used to switch data signals and test signals, each photonic switch having inputs, outputs, and a redundant path;
   an optical fiber, connecting an output of the first stage photonic switch to an input of the second stage photonic switch;
   the first stage photonic switch further including a signal source, optically connected to the redundant path of the first stage photonic switch; and
   the second stage photonic switch further including a signal detector, optically connected to the redundant path of the second stage photonic switch.

7. The apparatus as in claim 6, the first stage photonic switch further including a signal detector optically connected to the redundant path of the first stage photonic switch.

8. The apparatus as in claim 7, the second stage photonic switch further including a signal source optically connected to the redundant path of the second stage photonic switch.

9. The apparatus as in claim 6, wherein:
   the first stage consists of X photonic switches, X>1;
   the second stage consists of Y photonic switches, Y>1;
   each photonic switch in each stage has inputs, outputs, a redundant path, a signal source optically connected to the redundant path, and a signal detector optically connected to the redundant path; and
   a photonic switch in the first stage is optically connected to more than one photonic switch in the second stage.

10. The apparatus as in claim 9, wherein at least two photonic switches in the first stage are optically connected to at least two photonic switches in the second stage.

11. The apparatus as in claim 10, wherein:
   there are a total of N stages, $N \geq 2$, each stage having at least one photonic switch; and
   for each number I in the numeric series (1 through N−1), one photonic switch in the $(I)^{th}$ stage is optically connected to one photonic switch in the $(I+1)^{th}$ stage.

12. The apparatus as in claim 11, wherein the N stages are arranged in a Clos multistage network.

13. The apparatus as in claim 11, wherein each photonic switch has its own test path, used in a self-test to eliminate the photonic switch as a source of faults.

14. The apparatus as in claim 9, wherein the signal source and signal detector are found in a single transceiver.

15. The apparatus as in claim 9, wherein the signal source transmits light, and the signal detector detects light.

16. The apparatus as in claim 15, wherein the light has a wavelength between 0.7 micrometer and 1 millimeter, inclusive.

17. An apparatus for fault detection within a photonic switch network, comprising:
   a plurality of photonic switches, each photonic switch used to switch data signals and test signals, each photonic switch having inputs, outputs, a redundant path, a signal source optically connected to the redundant path, and a signal detector optically connected to the redundant path; and
   optical fibers interconnecting inputs and outputs of the photonic switches.

18. The apparatus as in claim 17, wherein the signal source transmits light, and the signal detector detects light.

19. The apparatus as in claim 18, wherein the light has a wavelength between 0.7 micrometer and 1 millimeter, inclusive.

* * * * *